United States Patent [19]

Tomita

[11] 4,274,002
[45] Jun. 16, 1981

[54] SCINTILLATION CAMERA

[75] Inventor: Yutaka Tomita, Tokyo, Japan

[73] Assignee: Tokyo Shibaura Denki Kabushiki Kaisha, Japan

[21] Appl. No.: 965,476

[22] Filed: Dec. 1, 1978

[30] Foreign Application Priority Data

Dec. 2, 1977 [JP] Japan ................. 52-144867

[51] Int. Cl.² ............................................. G01T 1/208
[52] U.S. Cl. ................................. 250/366; 250/363 S; 250/369
[58] Field of Search ................. 250/363 S, 364, 366, 250/369; 328/142, 158

[56] References Cited

U.S. PATENT DOCUMENTS

| 3,732,419 | 5/1973 | Kulberg et al. | 250/363 S |
| 3,908,128 | 9/1975 | Richey | 250/366 |
| 4,071,762 | 1/1978 | Lange et al. | 250/369 |

Primary Examiner—Alfred E. Smith
Assistant Examiner—Janice A. Howell
Attorney, Agent, or Firm—Finnegan, Henderson, Farabow, Garrett & Dunner

[57] ABSTRACT

Photomultiplier tubes for converting photons converted from radiant rays by a scintillator into electric signals are severally connected to preamplifiers. The outputs of the preamplifiers are connected to weighting resistors through nonlinear amplifying circuits. The nonlinear amplifying circuit nonlinearly amplifies the output signals of each two adjacent preamplifiers in accordance with the correlation between the output signals of the preamplifiers, thereby producing two output signals.

5 Claims, 4 Drawing Figures

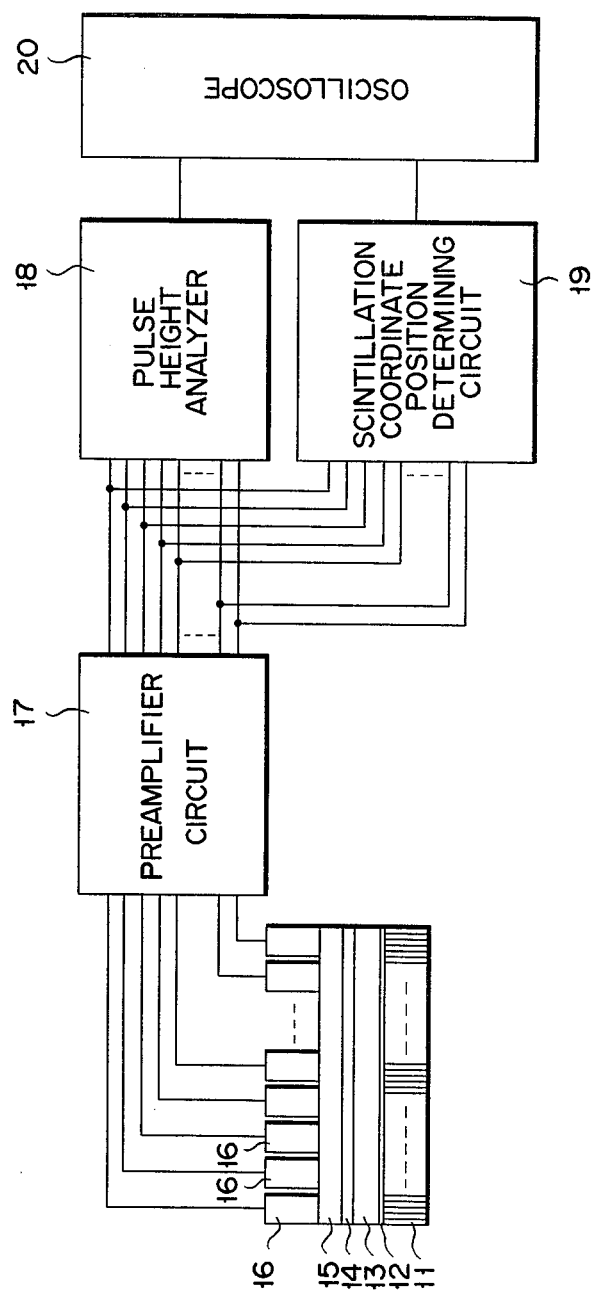
F I G. 1

SCINTILLATION CAMERA

This invention relates to a gamma rays sensing device, more specifically to a scintillation camera for detecting gamma rays emitted from a human body.

Scintillation cameras are used to diagnose the shapes of internal organs, tumors, cancer, etc. from the distribution of gamma rays emitted from a human body and the time elapsed, externally detecting the gamma rays by applying a radioisotope to the human body. According to such scintillation cameras, the gamma rays collimated by a collimator are converted into rays of light by a scintillator, and the light rays are converted into electric signals by photomultiplier tubes arranged in close vicinity to the scintillator. Hereupon, the quantity of light received by each photomultiplier tube varies with the distance between a light spot or scintillation position provided by the scintillator and the photomultiplier tube, so that the position of the light spot is calculated by combining the output signals from the photomultiplier tubes, and thus the X-Y coordinates of the light spot are obtained as electric signals. These electric signals are supplied to an oscilloscope, where they are represented as radiation distribution of the gamma rays.

Thereupon, the sensitivity of the aforementioned scintillation camera may be improved by bringing the scintillator close to the photomultiplier tube. If this is done, however, the scintillation position where the gamma ray is converted into light will be wrongly calculated, whereby a number of light spots concentrate on the central position of the photomultiplier tube. That is, the central portion of the photomultiplier tube becomes hot. In order to eliminate this "hot" effect, there are adopted some optical methods; insertion of a light guide between the scintillator and photomultiplier tube, further arrangement of a shading member between the light guide and scintillator, etc. By these methods, however, the quantity of light incident upon the photomultiplier tube is reduced by the light guide, etc. to increase the statistical error peculiar to the photomultiplier tube, making it impossible to obtain accurate distribution of gamma rays.

Accordingly, the object of this invention is to provide a scintillation camera capable of electrically correcting the "hot" effect at the central portion of a light detecting element and free from wrong calculation of scintillation position.

According to the invention, there is provided a scintillation camera in which circuits for nonlinearly amplifying electric signals from light detecting elements in accordance with a characteristic corresponding to the relative positions of the light detecting elements are disposed between the light detecting elements and weighting resistors.

This invention can be more fully understood from the following detailed description when taken in conjunction with the accompanying drawings, in which:

FIG. 1 is a block circuit diagram of a scintillation camera according to an embodiment of this invention;

Figure 2:
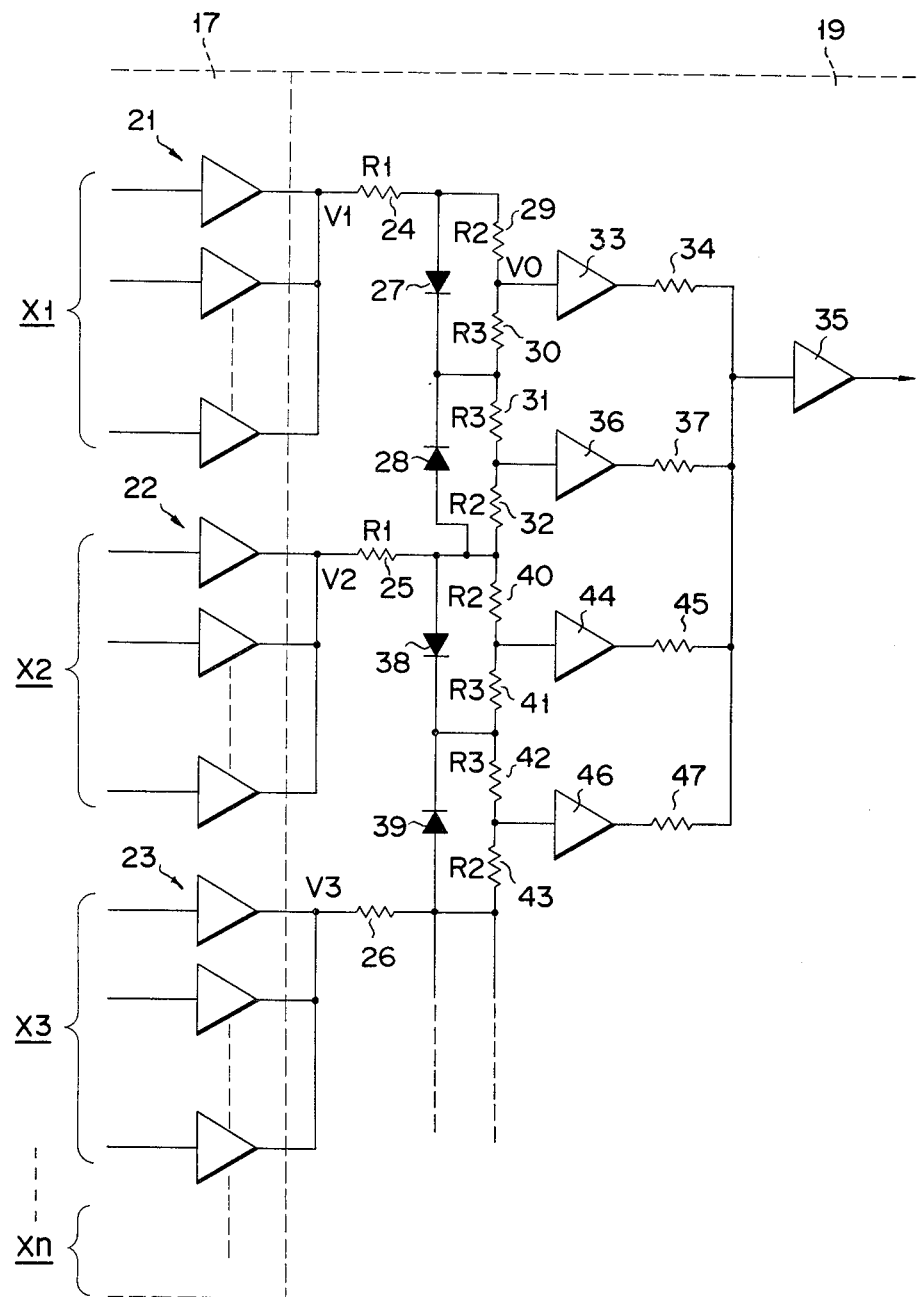
FIG. 2 is a diagram of a scintillation coordinate position determining circuit as shown in FIG. 1.

Referring now to FIG. 1, a scintillator 13 is disposed on a collimator 11 through an aluminium film 12. The scintillator 13, which is formed of e.g. an NaI(T1) crystal plate, converts gamma rays into rays of light. A sheet of Pyrex 14 is disposed on the scintillator 13, and a light guide 15 (not essential to the invention) is laid on the Pyrex 14. In close vicinity to the light guide 15 are a plurality of photoconverter elements, such as photomultiplier tubes 16, arranged in the X- and Y-axis directions. FIG. 1 shows photomultiplier tubes in the X-axis direction. The outputs of these photomultiplier tubes 16 are connected to a pulse height analyzer 18 and a scintillation coordinate position determining circuit 19 via a preamplifier circuit 17. The outputs of the pulse height analyzer 18 and scintillation coordinate position determining circuit 19 are connected to a display device or oscilloscope 20, for example.

In the scintillation camera of FIG. 1, when gamma rays emitted from a human body applied with a radioisotope reach the scintillator 13 via the collimator 11 and aluminium film 12, scintillation is caused at the scintillator 13, converting the gamma rays into spots or photons of light. Light rays from the light spots fall upon the photomultiplier tubes 16 through the Pyrex 14 and light guide 15, and are converted into electric signals by the photomultiplier tubes 16. The output signals of the photomultiplier tubes 16 are amplified by the preamplifier circuit 17, and supplied to the pulse height analyzer 18 and scintillation coordinate position determining circuit 19. The output signals supplied to the pulse height analyzer 18 have their acceptable energy levels determined at the analyzer. Those output signals with acceptable energy are supplied to the oscilloscope 20.

Meanwhile, at the scintillation coordinate position determining circuit 19, a scintillation coordinate position where scintillation is caused is determined according to the output signals of the photomultiplier tubes 16. Coordinate signals corresponding to the determined scintillation position are delivered from the scintillation coordinate position determining circuit 19 to the X- and Y-axis inputs of the oscilloscope 20. When the coordinate signals and acceptable signals are supplied to the oscilloscope 20, an image corresponding to the distribution of the gamma rays from the human body is formed on the screen of the oscilloscope.

According to this invention, the scintillation camera of FIG. 1, to operate in the aforesaid manner specially, is characterized by the scintillation coordinate position determining circuit 19. FIG. 2 shows a circuit diagram of this coordinate position determining circuit 19. In FIG. 2, amplifier groups 21, 22 and 23 of the preamplifier circuit 17 are connected, respectively, to the photomultiplier tubes 16 corresponding to a plurality of X coordinate axes $X_2, X_2, \ldots X_n$. The amplifiers of the amplifier group 21 are connected to one end of a resistor 24, and likewise the outputs of the amplifiers of the amplifier groups 22 and 23 are connected to one end of their corresponding resistors 25 and 26. The other ends of the resistors 24 and 25 are connected to the anodes of diodes 27 and 28, respectively. The cathodes of the diodes 27 and 28 are connected with each other. That is, the diodes 27 and 28 are forward to forward diodes. The diode 27 is connected in parallel with a series circuit of resistors 29 and 30, while the diode 28 is connected in parallel with a series circuit of resistors 31 and 32. The node between the resistors 29 and 30 is connected to an amplifier 35 through a voltage follower 33 and a resistor 34. Similarly, the node between the resistors 31 and 32 is connected to the amplifier 35 through a voltage follower 36 and a resistor 37. The diodes 27 and 28, resistors 29 and 32, and the voltage followers 33 and 36 constitute a nonlinear amplifying circuit. Further, the other ends of the resistors 25 and 26 are connected to the anodes of diodes 38 and 39, respectively, between the amplifier groups 22 and 23. The cathodes of the diodes 38 and 39 are connected to each other. The diode 38 is connected in parallel with a series circuit of resistors 40 and 41, while the diode 39 is connected in parallel with a series circuit of resistors 42 and 43. The node between the resistors 40 and 41 is connected to the summing amplifier 35 through a voltage follower 44 and a resistor 45. The node between the resistors 42 and 43 is connected to the amplifier 35 via a voltage follower 46 and a resistor 47. Likewise, nonlinear amplifying circuits are connected between the outputs of amplifier groups corresponding to another X-axis. The resistors 34, 37, 45 and 47 connected respectively to the outputs of the voltage followers 33, 36, 44 and 46 are weighting resistors having resistance values determined in accordance with the position coordinates of their corresponding multiplier tubes.

Let it be assumed that, in the scintillation camera of the aforementioned arrangements, the total output voltage of the amplifiers of the amplifier group 21 is $V_1$, the total output voltage of the amplifiers of the amplifier group 22 is $V_2$, the threshold voltage of the diode 27 is $V_T$, the resistance value of the resistors 24 and 25 is $R_1$, the resistance value of the resistors 29 and 32 is $R_2$, the resistance value of the resistors 30 and 31 is $R_3$, and the input voltage of the voltage follower 33 is $V_0$. When scintillation is caused at a position at a distance longer than the diameter of the photomultiplier tube from the tube, the output voltage of the amplifier groups 21, 22 and 23 can be regarded as a very low value. Accordingly, if $$(V_1 - V_2) \times \frac{R_2 + R_3}{2(R_1 + R_2 + R_3)} < V_T, \quad (1)$$

the input voltage $V_0$ of the voltage follower 33 is $$V_0 = V_1 - (V_1 - V_2) \times \frac{R_1 + R_2}{2(R_1 + R_2 + R_3)}, \quad (2)$$

whereas if $$(V_1 - V_2) \times \frac{R_2 + R_3}{2(R_1 + R_2 + R_3)} \geq V_T, \quad (3)$$

then $$V_0 = \frac{(R_1 + R_2 + R_3)V_1 + R_1 V_2}{2R_1 + R_2 + R_3} + \quad (4)$$

$$(\frac{R_1}{2R_1 + R_2 + R_3} - \frac{R_2}{R_2 + R_3})V_T.$$

In the circuit of FIG. 2, equation (3) generally holds only where $V_1 \gg V_2$ and the diode 27 is forward-biased while the diode 28 is cut off, so that equation (4) may be simplified as follows:

$$V_0 = \frac{R_1 + R_2 + R_3}{2R_1 + R_2 + R_3} V_1 + \quad (5)$$

$$(\frac{R_1}{2R_1 + R_2 + R_3} - \frac{R_2}{R_2 + R_3})V_T.$$

Figure 3:
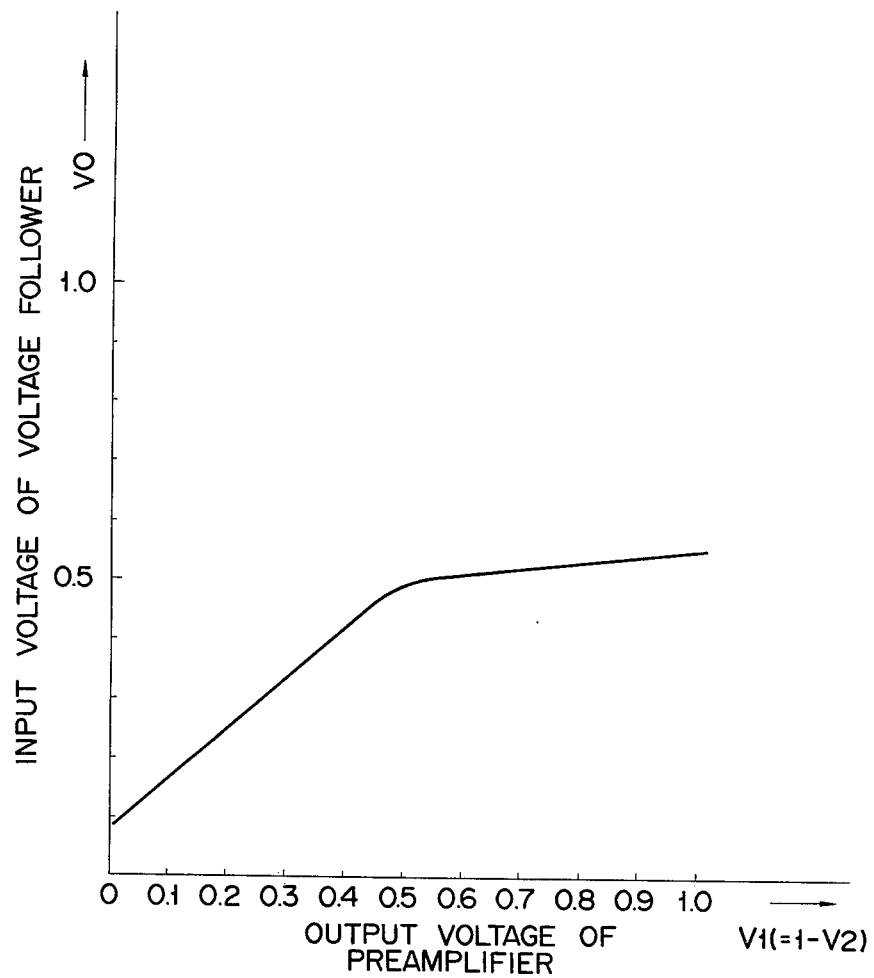
FIG. 3 shows a characteristic curve of the input voltage of a voltage follower versus the output voltage of a preamplifier.

In consequence, the input voltage $V_0$ of the voltage follower 33 can be attenuated in the higher value than a predetermined value by suitably selecting the resistance value of the resistors $R_1$, $R_2$ and $R_3$. That is, the input voltage $V_0$ can be increased nonlinearly. If $R_1 = 10R$, $R_2 = R_3 = R$, $V_T = 0.1 \times V_0 \text{max}$, and $V_2 = 1 - V_1$, for example, the input voltage $V_0$ for the voltage $V_1$ changes nonlinearly as shown in FIG. 3. Similarly, when $V_1 \ll V_2$, the diode 28 is forward-biased while the diode 27 is cut off. Then, the input voltage $V_0'$ of the voltage follower 36 is $$V_0' = \frac{R_1 + R_2 + R_3}{2R_1 + R_2 + R_3} V_2 + (\frac{R_1}{2R_1 + R_2 + R_3} - \frac{R_2}{R_2 + R_3})V_T$$

Likewise, the input voltage of the voltage followers 44 and 46 may be obtained from the relation between the output voltage $V_2$ of the amplifier group 22 and the output voltage $V_3$ of the amplifier group 23.

The outputs of the voltage followers 33, 36, 44 and 46 are supplied through their corresponding weighting resistors 34, 37, 45 and 47 to the summing amplifier 35, where they are added and amplified together. The output of the summing amplifier 35 is supplied to the oscilloscope 20 of FIG. 1 as a coordinate position signal for the X-axis. On the other hand, the coordinate position signal for the Y-axis may be obtained by supplying a signal obtained from the photomultiplier tubes 16 along the Y-axis to a Y-axis coordinate position determining circuit (not shown) having the same configuration as shown in FIG. 2.

Figure 4:
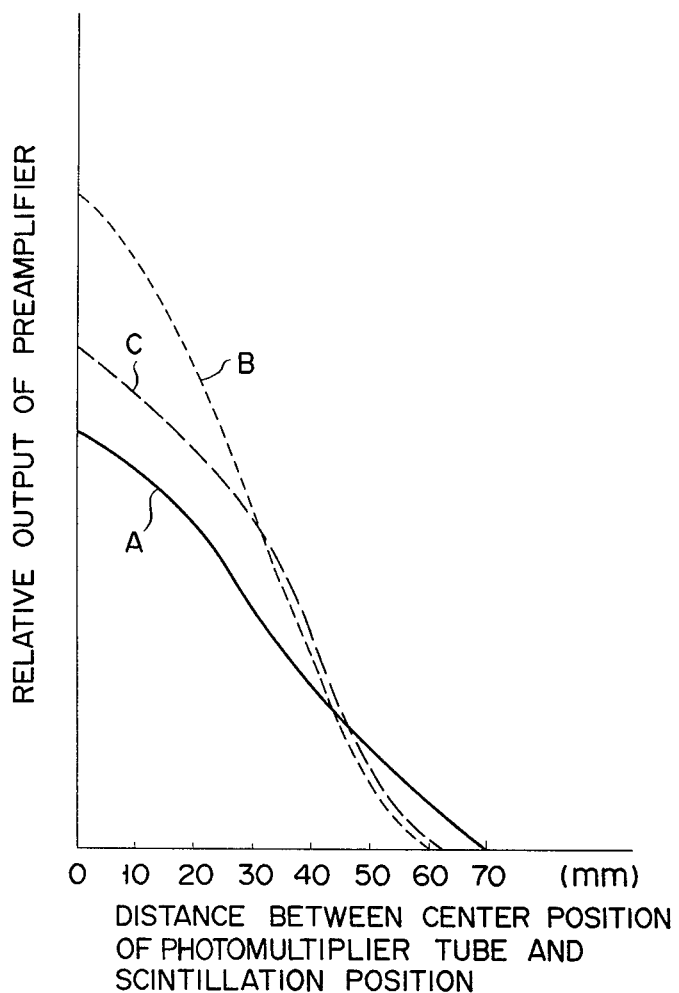
FIG. 4 shows characteristic curves of the relative output of the preamplifier versus the distance between a photomultiplier tube and a scintillation position.

Referring now to the graph of FIG. 4, there will be described the relation between the distance between the center of the photomultiplier tube and the scintillation position and the amplifier output. In FIG. 4, characteristic curve A represents the relation between the photomultiplier tube and the scintillation position where the former is disposed distant from the latter. On the other hand, characteristic curve B represents the photomultiplier tube to scintillation position relation where the former is disposed close to the latter. Comparison of these two characteristic curves A and B reveals that attenuation of the amplifier output for curve B is steeper than that for curve A where the distance between the photomultiplier tube and the scintillation position is 20 mm or more. If the amplifier output is attenuated so drastically as indicated by curve B, the scintillation position will be wrongly determined on the basis of the amplifier output.

According to this invention, however, the output of the photomultiplier tube is amplified in accordance with the nonlinear characteristic as shown in FIG. 3 by employing the circuits as shown in FIG. 2, so that the relation between the photoamplifier tube to scintillation position distance and the amplifier output is approximated to characteristic curve A of the scintillation camera in which the photomultiplier tube is disposed distant from the scintillation position, as indicated by curve C of FIG. 4. That is, the effective low level signal components of the output signals of the photomultiplier tubes are amplified substantially, and the excessive-level signal components are suppressed, thereby providing amplification signals with uniformity. Thus, there will be obtained position detecting outputs with satisfactory uniformity to prevent detection of any wrong position even though the photomultiplier tube is disposed close to the scintillation position. Moreover, in accordance with such position detecting outputs, there may be obtained a scintigraph with good resolution on the screen of the oscilloscope.

Furthermore, according to this invention, the output terminals of two adjacent preamplifier groups 21 and 22, for example, among others are coupled together through the resistors 24, 25, 29, 30, 31 and 32, the outputs being taken out through two points—the nodes between the resistors 29 and 30 and between the resistors 31 and 32, and supplied severally to the corresponding weighting resistors 34 and 37. Accordingly, the position detection may be achieved with a ratio of 2-to-1 with respect to the number of the photomultiplier tubes, substantially facilitating the adjustment of uniformity.

What is claimed is:

1. A scintillation camera comprising a collimator for collimating gamma rays, a scintillator disposed on said collimator for converting the gamma rays into photons; a plurality of photo-converter elements arranged in close vicinity to said scintillator; a plurality of preamplifiers connected to said photoconverter elements for amplifying electric signals from said photo-converter elements, respectively; a plurality of nonlinear amplifying means connected between the outputs of each two adjacent amplifiers of said preamplifiers for amplifying the output signals of said two adjacent amplifiers correspondingly to the correlation between said two output signals in accordance with a prescribed nonlinear characteristic, thereby producing two output signals; a plurality of weighting resistor circuits severally connected to the outputs of said nonlinear amplifying means and each including a pair of resistors to which said two output signals of each said nonlinear amplifying means are delivered respectively, said resistors having a resistance value in accordance with one corresponding position of said photo-converter elements; a summing amplifier for adding the output signals of said nonlinear amplifying means through said weighting resistor circuits; and a display device connected to said summing amplifier for displaying an image corresponding to a distribution of the gamma rays in accordance with the signals therefrom.

2. A scintillation camera according to claim 1, wherein each said nonlinear amplifying means includes two forward-to-forward diodes connected between the respective output terminals of said two adjacent amplifier circuits, a pair of series resistor circuits each having at least two resistors connected severally in parallel with said diodes and in series with one another, and a voltage follower circuit connected to the nodes between the respective two resistors of said series resistor circuits.

3. A scintillation camera according to claim 2, wherein a plurality of resistors are connected between the output terminals of said preamplifier circuits and said nonlinear amplifying means.

4. A scintillation camera according to claim 1, 2 or 3 wherein each of said photo-converter elements is a photomultiplier tube.

5. A scintillation camera comprising:
a collimator for collimating gamma rays;
a scintillator disposed on said collimator for converting the gamma rays into photons;
a plurality of photo-converter elements arranged in close vicinity to said scintillator for converting the photons into electric signals;
a plurality of preamplifiers connected to said photo-converter elements for amplifying the electric signals of said photo-converter elements;
a non-linear circuit connected between a pair of said preamplifiers, said non-linear circuit including first and second threshold devices which are selectively operative in response to the output signals of said pair of preamplifiers;
first and second amplifiers coupled, respectively, to said threshold devices for amplifying the output signals of said non-linear circuit;
weighting resistor circuits connected to said amplifiers, each of said weighing resistor circuits having a resistance value in accordance with one corresponding position of said photo-converter elements;
a summing amplifer for summing the output signals supplied through said weighting resistor circuits;
a pulse height analyzer connected to said preamplifiers for detecting acceptable energy levels of the output signals of said preamplifiers; and
a display device for displaying an image corresponding to a distribution of the gamma rays in response to the output signals of said summing amplifier and said pulse height analyzer.

* * * * *